(12) United States Patent
Matteson et al.

(10) Patent No.: US 9,574,597 B2
(45) Date of Patent: Feb. 21, 2017

(54) FASTENING DEVICE

(71) Applicant: Lenovo Enterprise Solutions (Singapore) Pte. Ltd., Singapore (SG)

(72) Inventors: Jason A. Matteson, Raleigh, NC (US); Mark E. Steinke, Durham, NC (US); Aparna Vallury, Apex, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 108 days.

(21) Appl. No.: 14/319,345

(22) Filed: Jun. 30, 2014

(65) Prior Publication Data
US 2015/0377274 A1 Dec. 31, 2015

(51) Int. Cl.
*F16B 31/02* (2006.01)

(52) U.S. Cl.
CPC .................. *F16B 31/028* (2013.01)

(58) Field of Classification Search
CPC .................................. F16B 31/028
USPC .................................. 411/9–11, 13
See application file for complete search history.

(56) References Cited

U.S. PATENT DOCUMENTS

| | | | |
|---|---|---|---|
| 3,021,747 A * | 2/1962 | Garrett | E21D 21/02 116/DIG. 34 |
| 3,153,974 A * | 10/1964 | Canning | F16B 31/028 411/13 |
| 3,323,403 A * | 6/1967 | Waisman | F16B 31/028 411/10 |
| 3,622,167 A | 11/1971 | Velthoven | |
| 3,948,141 A | 4/1976 | Shinjo | |
| 4,322,193 A | 3/1982 | Stahl | |
| 4,988,246 A * | 1/1991 | Yoshida | F16B 31/028 116/DIG. 34 |
| 5,280,967 A | 1/1994 | Varrin, Jr. | |
| 5,927,918 A * | 7/1999 | Burger | B60D 1/06 280/513 |
| 6,227,784 B1 * | 5/2001 | Antoine | F02B 77/00 411/11 |
| 6,425,718 B1 | 7/2002 | Herr et al. | |
| 6,609,865 B2 | 8/2003 | Daigneault | |
| 7,405,939 B2 | 7/2008 | Yang | |
| 8,382,409 B2 | 2/2013 | Wallace | |

(Continued)

FOREIGN PATENT DOCUMENTS

WO 03033877 A1 4/2003

OTHER PUBLICATIONS

Fernando, S., "The Function of Washers in a Bolted Joint", Technical note : AFI/02/007. AJAX Fasteners Innovations, Aug. 13, 2002. pp. 1-8.

(Continued)

*Primary Examiner* — Flemming Saether
(74) *Attorney, Agent, or Firm* — Zilka-Kotab, PC

(57) ABSTRACT

A fastening device is disclosed. The fastening device has a vertical protrusion for fastening. A horizontal portion and an indicator are used for seating. The horizontal portion extends from the vertical protrusion for providing a clue to indicate that the fastening device is seated correctly. In embodiments, the clue is a color or a texture. In embodiments, a bellow is used with elastomeric properties. When the right load and torque are applied, the bellow covers the horizontal portion such that the color and/or texture of a perspective directed at the horizontal portion appear to be changed.

14 Claims, 4 Drawing Sheets

(56) References Cited

U.S. PATENT DOCUMENTS

2009/0311066 A1    12/2009  Utille

OTHER PUBLICATIONS

Hopwood II, T., et al., "Load Indicating Washers", Research Report KTC-89-55, Kentucky Transportation Research Program, Lexington, KY. Oct. 1989. 13 pages.
Schmeckpeper, E., et al., "The Effects of Over-Compressing ASTM F959 Direct Tension Indicators on A325 Bolts Used in Shear Connections", Engineering Journal, First Quarter, 1999. University of Idaho. pp. 39-45.
Unknown, "Learn How Visual Tension Indicators Work", Technical Information for Direct Tension Indicating (DTI) SmartBolts. Copyright @ 2014 SmartBolts Direct Tension Indicator www.smartbolts.com/technical-information/.

* cited by examiner

FASTENING DEVICE

BACKGROUND

This disclosure relates generally to fastening devices and, more particularly, relates to a heat sink fastening device. As computer technology continues to advance, electronic components such as central processing units (CPUs) of computers are being made to provide faster operational speeds and greater functional capabilities. When a CPU operates at a high speed in a computer enclosure, its temperature can increase rapidly. It is desirable to dissipate the generated heat of the CPU quickly, for example, by using a heat sink attached to a surface of the CPU. This allows the CPU and other high-performance electronic components in the enclosure to operate within their normal operating temperature ranges, thereby assuring the quality of data management, storage and transfer for the CPU. Oftentimes, fastening devices are required for mounting the heat sink to, for example, the CPU. The fastening devices and the heat sink may be pre-assembled together before the heat sink is finally mounted to the electronic component in order to facilitate mounting of the heat sink by end users. The end users can be asked to manually manipulate the fastening device to mount the heat sink.

SUMMARY

Aspects of the disclosure include a fastening device (or assembly). The fastening device has a vertical protrusion for fastening and a horizontal portion extending from the vertical protrusion for providing a clue indicating correct seating of the fastening device. The vertical protrusion can have a body area which fits through an inner bore. Aspects of the fastening device include an indicator. In one embodiment, a bellow is used with elastomeric properties. When the right load and torque are applied, the bellow covers the horizontal portion such that the color and/or texture of a (visual) perspective directed at the horizontal portion appear to be changed. In other embodiments, a leaf spring may be used in a manner similar to the bellow.

The horizontal portion is used for seating. The horizontal portion may extend from the vertical protrusion. The horizontal portion has the inner bore for receiving the vertical protrusion. The horizontal portion has a floor. The floor can include a first distinguishing feature configured to be hidden beneath an indicator in a second seating state. In embodiments, the horizontal portion has a wall (e.g., in embodiments where the horizontal portion is a c-cup). The wall may be configured to abut the indicator in the second seating state.

The indicator is used for seating. The indicator may abut both the vertical protrusion and the horizontal portion. The indicator may be configured to have a first seating state for an unachieved seating tightness threshold and configured to have the second seating state for an achieved seating tightness threshold. In embodiments, the indicator includes or is an elastomeric bellow. In embodiments, the indicator has a second distinguishing feature for differentiation from the first distinguishing feature. The second distinguishing feature may be, in cooperation with the horizontal portion and the vertical protrusion, configured to identify the second state for the achieved seating tightness threshold.

DETAILED DESCRIPTION

Figure 1:
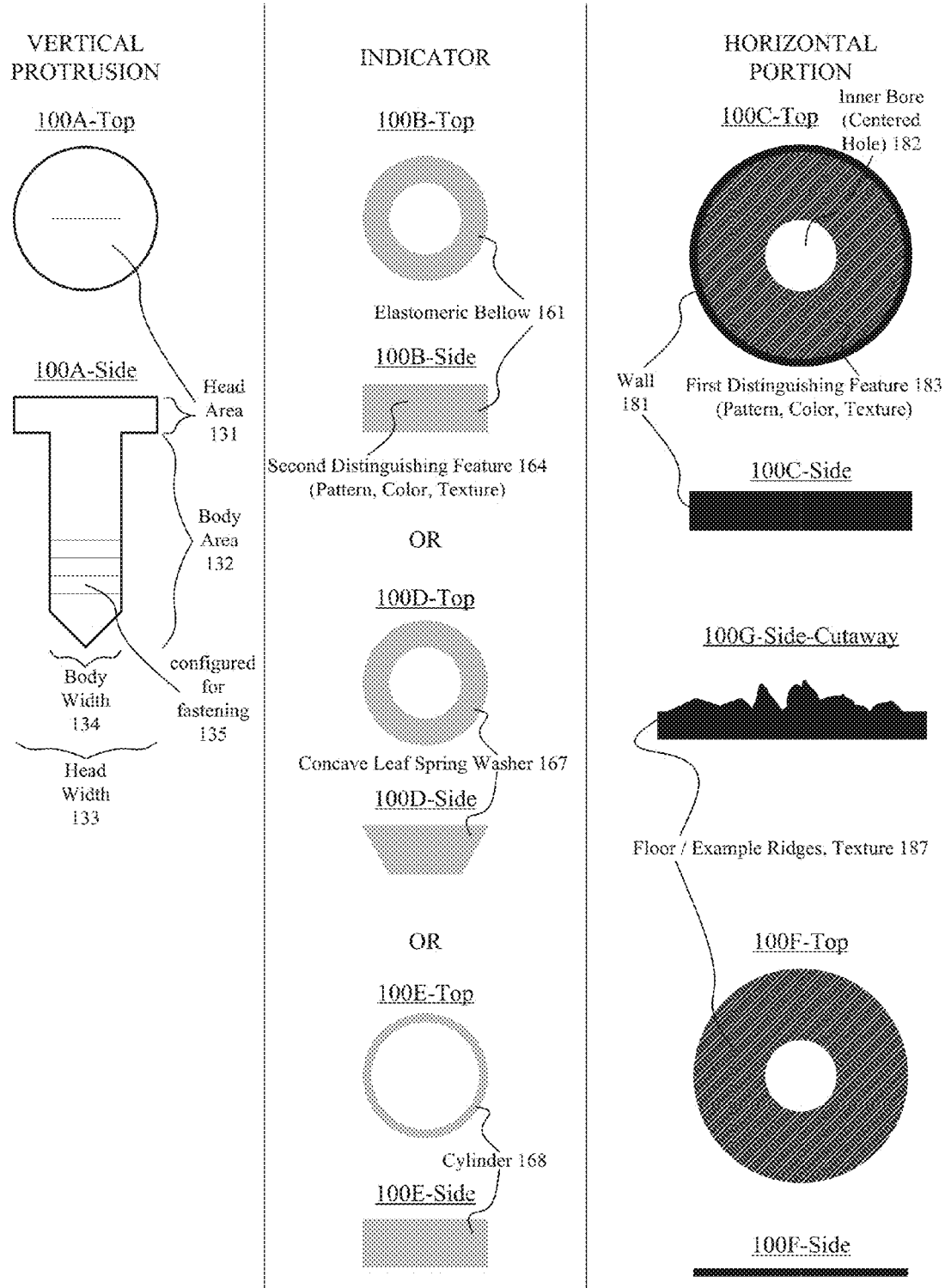
FIG. 1 is a set of top and side views of pieces to a fastening device, consistent with embodiments of the present disclosure.

Aspects of the disclosure include a fastening device having a vertical protrusion for fastening and a horizontal portion extending from the vertical protrusion for providing a visual clue (e.g., color and/or texture) to indicate that the fastening device is seated correctly. In one embodiment, a bellow is used with elastomeric properties. When the right load and torque are applied, the bellow covers the horizontal portion such that the color and/or texture of a (visual) perspective directed at the horizontal portion appear to be changed. In other embodiments, a leaf spring may be used in a manner similar to the bellow.

CPU heat sinks can often be some of the largest heat sinks in a server. As such, heavy load and torque may be desirable to install them in the system. In general, the load is to be evenly spread across the (four) screws of the heat sink for a proper attachment of the heat sink to the lid. However, there are instances where this does not occur (e.g., due to human error), leading to a subpar thermal interface between the heat sink and the processor. Such thermal interface can lead to throttling or thermal failures. Instances exist where the lack of proper technique for attachment of the heat sink results in customer field issues. In order to promote positive impacts of performance and efficiency (e.g., avoid/reduce human error in installing heat sinks), providing a visual/textural indicator with the fastening device may be beneficial.

Aspects of the disclosure include a fastening device (or assembly). In embodiments, the fastening device may be for a heat sink. Aspects of the fastening device include a vertical protrusion. The vertical protrusion is used for fastening. The vertical protrusion can have a body area which fits through an inner bore. The vertical protrusion can have a head area that is wider than the body area. The vertical protrusion can be configured to fasten the heat sink to an apparatus (e.g., lid or CPU).

Aspects of the fastening device include a horizontal portion. The horizontal portion is used for seating. In embodiments, the horizontal portion is a c-cup. The horizontal portion may extend from the vertical protrusion. The horizontal portion has the inner bore for receiving the vertical protrusion. In embodiments, the inner bore may be a centered hole. The centered hole can be configured to allow the body area to fit through the centered hole and configured to disallow the head area to fit through the centered hole. The horizontal portion has a floor. The floor can include a first distinguishing feature configured to be hidden beneath an indicator in a second seating state. In embodiments, the horizontal portion has a wall (e.g., in embodiments where the horizontal portion is a c-cup). The wall may be configured to abut the indicator in the second seating state.

Aspects of the fastening device include an indicator. The indicator is used for seating. The indicator may abut both the vertical protrusion and the horizontal portion. The indicator may be configured to have a first seating state for an unachieved seating tightness threshold and configured to have the second seating state for an achieved seating tightness threshold. In embodiments, the indicator includes or is an elastomeric bellow. In embodiments, the indicator includes or is a concave leaf spring washer. In embodiments, the indicator includes or is a cylindrical structure. In embodiments, the indicator has a second distinguishing feature for differentiation from the first distinguishing feature. The second distinguishing feature may include a visually-identifiable feature. The second distinguishing feature may include a texturally-identifiable feature. The second distinguishing feature may be, in cooperation with the horizontal portion and the vertical protrusion, configured to identify the second state for the achieved seating tightness threshold.

FIG. 1 is a set of top and side views of pieces to a fastening device, consistent with embodiments of the present disclosure. A vertical protrusion 100A is used for fastening (i.e., configured for fastening 135). The vertical protrusion 100A can have a body area 132 (which fits through an inner bore 182 of a horizontal portion 100C or 100F). The vertical protrusion 100A can have a head area 131 that is wider than the body area (i.e., head width 133 is greater than body width 134). The vertical protrusion 100A can be configured to fasten the heat sink to an apparatus (e.g., lid or CPU).

A horizontal portion 100C (or 100F) is used for seating. In embodiments, the horizontal portion is a c-cup (see horizontal portions 100C and 230 in FIG. 2). The horizontal portion 100C (or 100F) may extend from the vertical protrusion 100A. The horizontal portion has the inner bore 182 for receiving the vertical protrusion 100A. In embodiments, the inner bore 182 may be a centered hole (e.g., as shown but could be an oval, a square, or another shape). The centered hole can be configured to allow the body area 132 to fit through the centered hole and configured to disallow the head area 131 to fit through the centered hole.

The horizontal portion 100C (or 100F) has a floor such as example floor 187. The floor such as example floor 187 can include a first distinguishing feature 183 configured to be hidden beneath an indicator (e.g., 100B, 100D, 100E) in a second seating state. The first distinguishing feature can be a color (e.g., red, orange, yellow, green, blue, indigo, violet, black, white), a pattern (e.g., checked, concentric, dots, grid, herringbone, lattice, stripe, pinstripe, swirl, waffle, zigzag), or a texture (e.g., rough, smooth, ridges, gritty, soft, firm, sandy, course, sharp). Combinations of distinguishing features are considered. In embodiments, the horizontal portion 100C (or 100F) has a wall 181 (e.g., in embodiments where the horizontal portion is a c-cup). The wall 181 may be configured to abut the indicator 100B/100D/100E in the second seating state (see 291 in FIG. 2 or 391 in FIG. 3).

The indicator 100B/100D/100E is used for seating. The indicator 100B/100D/100E may abut both the vertical protrusion 100A and the horizontal portion 100C/100F (see FIG. 2, FIG. 3, FIG. 4). The indicator 100B/100D/100E may be configured to have a first seating state for an unachieved seating tightness threshold and configured to have the second seating state for an achieved seating tightness threshold (see FIG. 2, FIG. 3, FIG. 4). In embodiments, the indicator 100B includes or is an elastomeric bellow 161 (see also FIG. 2). In embodiments, the indicator 100D includes or is a concave leaf spring washer 167 (see also FIG. 3). In embodiments, the indicator 100E includes or is a cylindrical structure such as cylinder 168 (see FIG. 4).

In embodiments, the indicator 100B/100D/100E has a second distinguishing feature 164 for differentiation from the first distinguishing feature 183. The second distinguishing feature 164 may include a visually-identifiable feature. The second distinguishing feature 164 may include a texturally-identifiable feature. For example, see floor 187 as shown by horizontal portion (side cutaway view) 100G. The second distinguishing feature 164 can be a color (e.g., red, orange, yellow, green, blue, indigo, violet, black, white), a pattern (e.g., checked, concentric, dots, grid, herringbone, lattice, stripe, pinstripe, swirl, waffle, zigzag), or a texture (e.g., rough, smooth, ridges, gritty, soft, firm, sandy, course, sharp). In particular, complementary colors, patterns, or textures may be used (e.g., red and green) to assist in showing differentiation (contrast, reinforcement). Combinations of distinguishing features are considered (e.g., orange-stripe-smooth and blue-swirl-rough). The second distinguishing feature 164 may, in cooperation with the horizontal portion 100C/100F(/100G) and the vertical protrusion 100A, be configured to identify the second state for the achieved seating tightness threshold.

Figure 2:
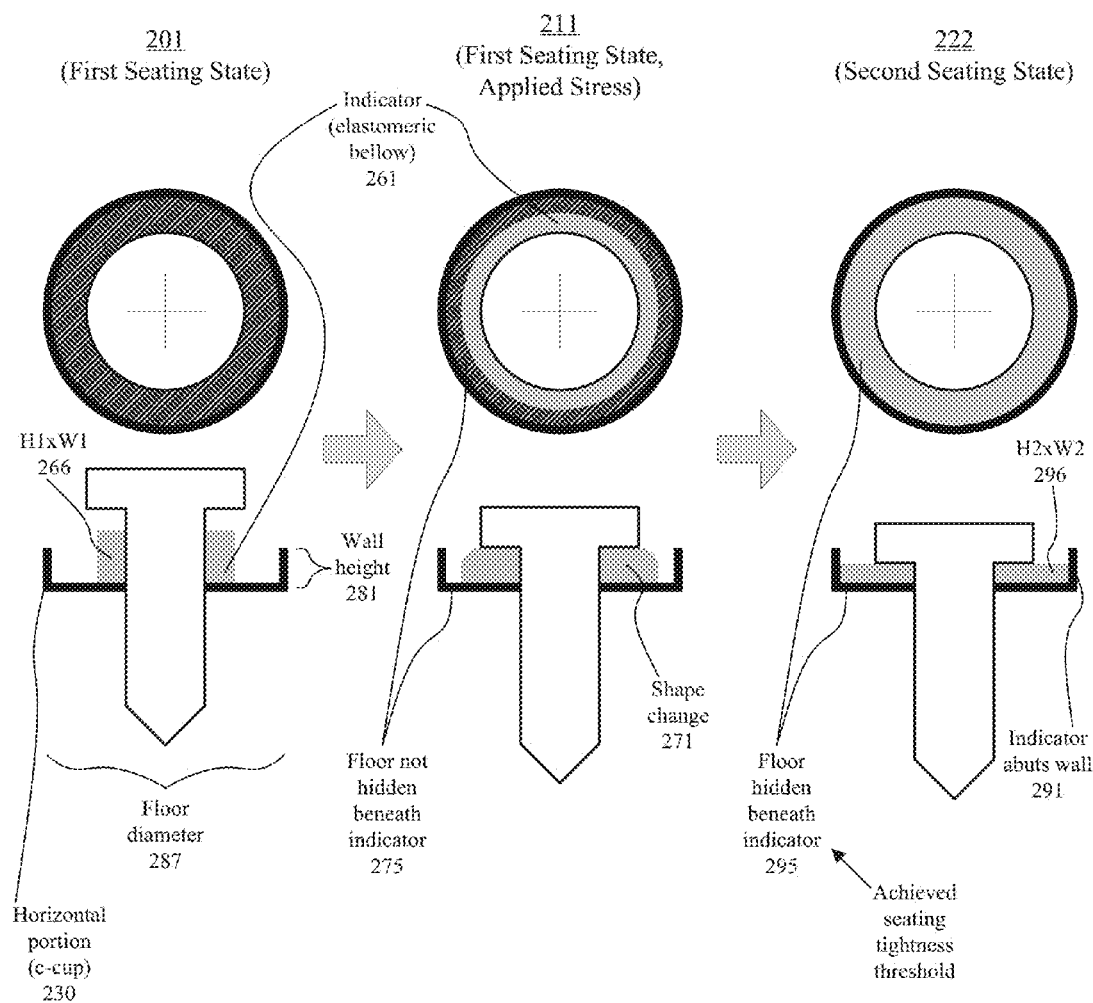
FIG. 2 is a diagram depicting a fastening device with an indicator shown as an elastomeric bellow, consistent with embodiments of the present disclosure.

FIG. 2 is a diagram depicting a fastening device with an indicator 261 shown as an elastomeric bellow, consistent with embodiments of the present disclosure. The fastening device is shown in a first seating state (e.g., before applying stress such as first seating state pre-stress 201, in response to applying stress such as first seating state during-stress 211) and a second seating state post-stress 222. The first seating state (pre-stress 201 or during-stress 211) may be for an unachieved seating tightness threshold (e.g., heat sink not sufficiently tight to lid to provide adequate thermal qualities). The second seating state (post-stress 222) may be for an achieved seating tightness threshold (e.g., heat sink sufficiently tight to lid to provide adequate thermal qualities). In embodiments, such thresholds may be directly proportional to an amount of applied stress or torque. In embodiments, such threshold may be measurable in units of distance, tension, pressure, force, or resulting thermal interface characteristics (e.g., heat dissipation).

In embodiments, the horizontal portion 230 may be a c-cup. The c-cup may have a wall configured to contain (e.g., deter/prevent/restrict from further shape change in a particular direction) and abut the indicator 261 in the second seating state 222. The horizontal portion 230 may have a floor diameter 287. The horizontal portion 230 may have a wall height 281. The indicator (elastomeric bellow) 261 may have differing dimensions (e.g., heights and cross-sectional segment widths) at various stages. In the first seating state pre-stress 201, it may be of a first height and a first width (H1×W1) 266. In the first seating state during-stress 211, its shape changes 271. In the second seating state post-stress 296, it may be of a second height and a second width (H2×W2) 296.

In embodiments, the indicator 261 may be configured to be taller (266) than the wall height 281 in the first seating state (e.g., 201) and shorter (296) than the wall height 281 in the second seating state (e.g., 222). Also, in embodiments, the floor diameter 287 may be greater (e.g., at least three times as large) as the wall height 281. In the first seating state 201/211, the floor may not be hidden beneath the indicator 261 as shown at 275. In the second seating state 222, the floor may be hidden beneath the indicator 261 as shown at 295 with the achieved seating tightness threshold. Combinations of such dimensions/configurations may assist in using sensory (e.g., visual, textural) capabilities to determine/indicate improper/proper seating.

For example, an indicator assembly can include a red c-cup and a green bellow that is made of a rubber/elastomer for elastic properties (e.g., the elastomeric bellow can include/be ethylene propylene diene monomer (EPDM) rubber). When the right load and torque is applied, the green bellow is squished out to cover or fill in the red c-cup fully—indicating that the heat sink attachment is correct. If the indicators are green on all four screws, the heat sink is properly installed. If the indicators are red (or not fully green), it suggests that a particular screw needs more torque. The c-cup may also have a pattern on it, which can act as visual indicator for people who are color blind. The c-cup may also have a texture to it, which can act as visual indicator for people who are blind.

Figure 3:
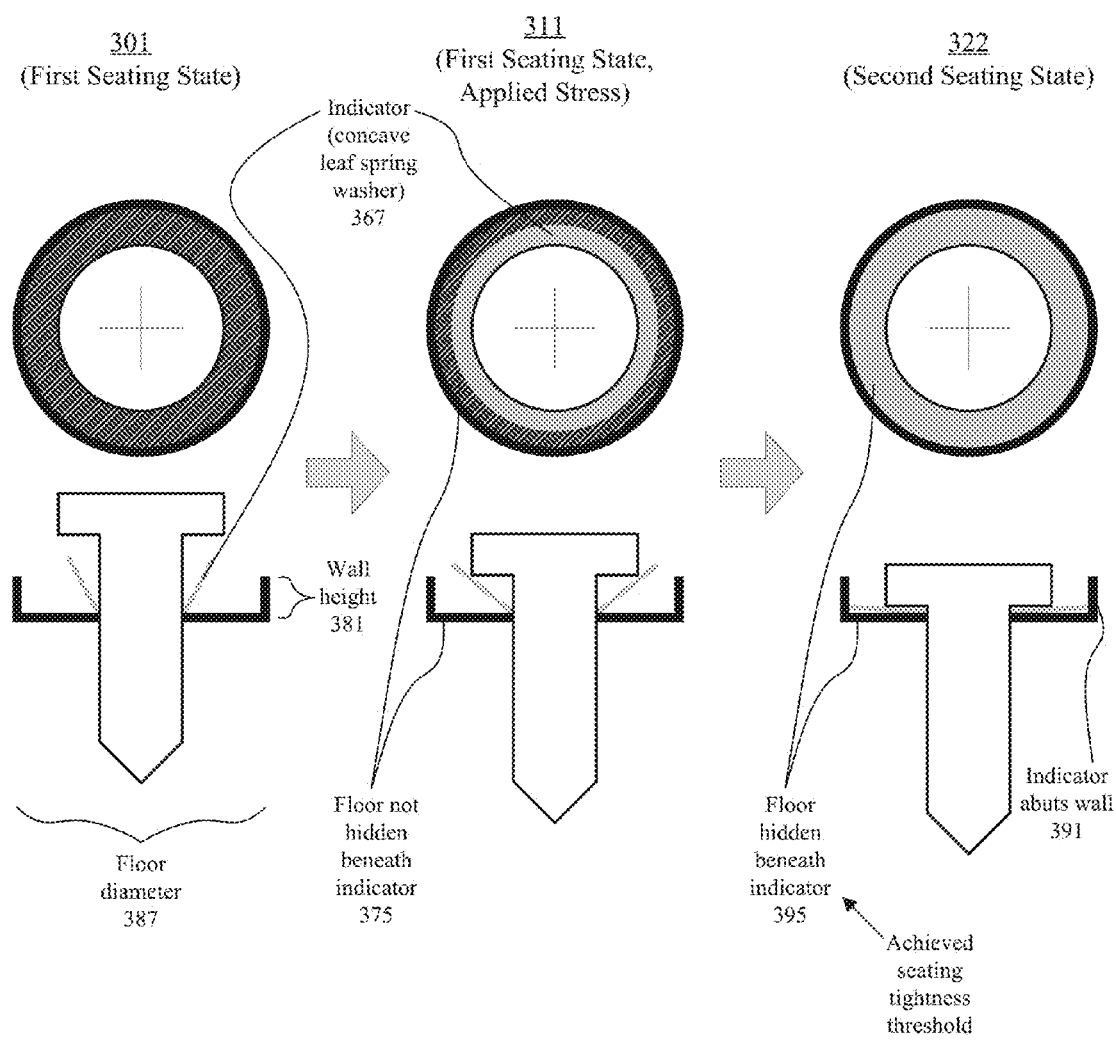
FIG. 3 is a diagram depicting a fastening device with an indicator shown as a concave leaf spring washer, consistent with embodiments of the present disclosure.

FIG. 3 is a diagram depicting a fastening device with an indicator 367 shown as a concave leaf spring washer, consistent with embodiments of the present disclosure. The fastening device is shown in a first seating state (e.g., before applying stress such as first seating state pre-stress 301, in response to applying stress such as first seating state during-stress 311) and a second seating state post-stress 322. The first seating state (pre-stress 301 or during-stress 311) may be for an unachieved seating tightness threshold (e.g., heat sink not sufficiently tight to lid to provide adequate thermal qualities). The second seating state (post-stress 322) may be for an achieved seating tightness threshold (e.g., heat sink sufficiently tight to lid to provide adequate thermal qualities). In embodiments, such thresholds may be directly proportional to an amount of applied stress or torque. In embodiments, such threshold may be measureable in units of distance, tension, pressure, force, or resulting thermal interface characteristics (e.g., heat dissipation).

The horizontal portion may have a floor diameter 387. The horizontal portion may have a wall height 381. In embodiments, the indicator (concave leave spring washer) 367 may be configured to be taller than the wall height 381 in the first seating state (e.g., 301) and shorter than the wall height 381 in the second seating state (e.g., 322). Also, in embodiments, the floor diameter 387 may be greater (e.g., at least three times as large) as the wall height 381. In the first seating state 301/311, the floor may not be hidden beneath the indicator 367 as shown at 375. In the second seating state 322, the floor may be hidden beneath the indicator 367 as shown at 395 with the achieved seating tightness threshold. Combinations of such dimensions/configurations may assist in using sensory (e.g., visual, textural) capabilities to determine/indicate improper/proper seating.

For example, an indicator assembly can include a red c-cup and a concave leaf spring washer. When the right load and torque is applied, the leaf spring is flattened out to cover the red c-cup fully—indicating that the heat sink attachment is correct. If the indicators are green on all four screws, the heat sink is properly installed. If the indicators are red (or not fully green), it suggests that a particular screw needs more torque. The c-cup may also have a pattern on it, which can act as visual indicator for people who are color blind. The c-cup may also have a texture to it, which can act as visual indicator for people who are blind. Also, the position of the leaf spring acts as an additional visual indicator.

Figure 4:
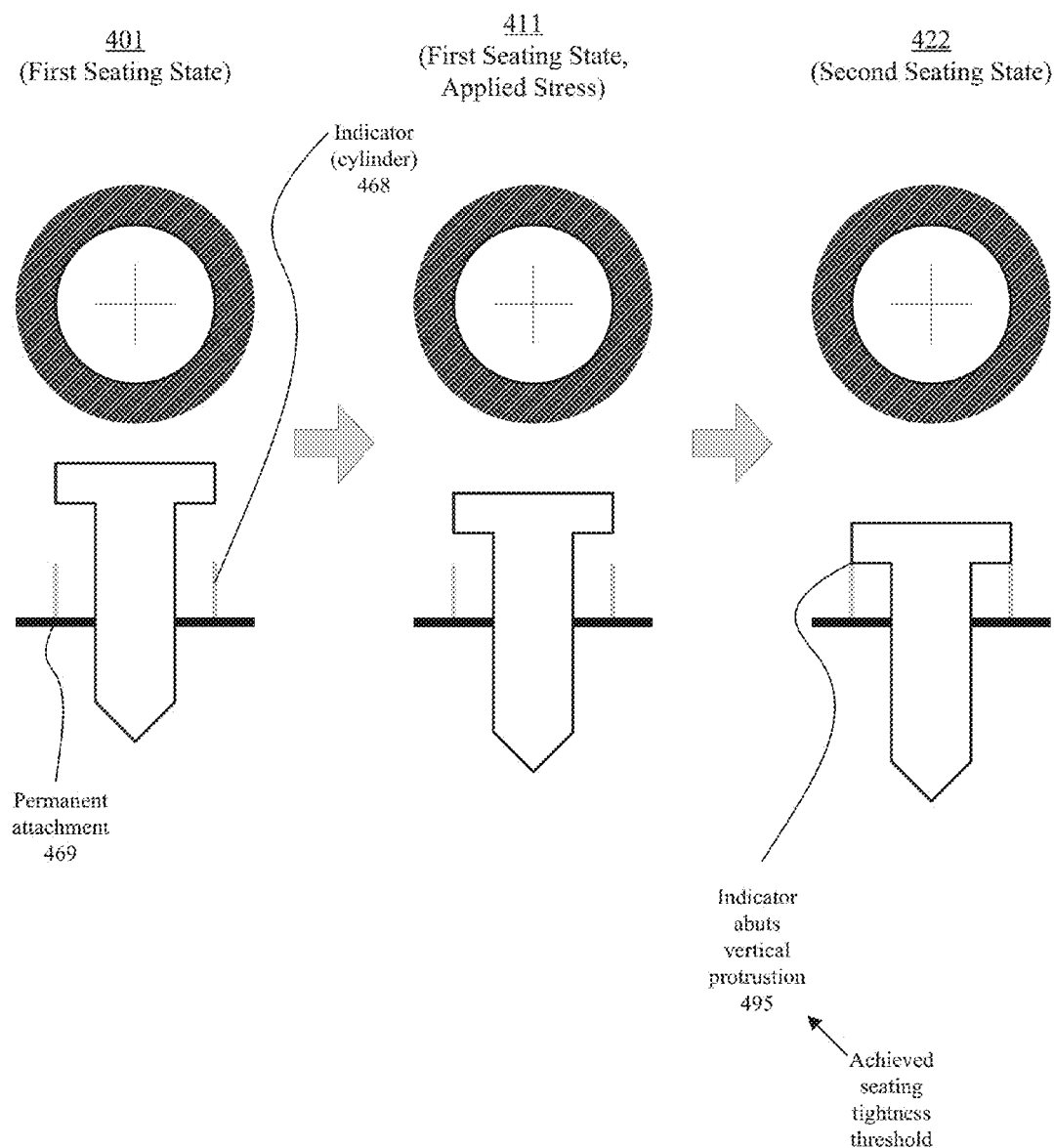
FIG. 4 is a diagram depicting a fastening device with an indicator shown as a cylindrical structure, consistent with embodiments of the present disclosure.

FIG. 4 is a diagram depicting a fastening device with an indicator 468 shown as a cylindrical structure, consistent with embodiments of the present disclosure. The fastening device is shown in a first seating state (e.g., before applying stress such as first seating state pre-stress 401, in response to applying stress such as first seating state during-stress 411) and a second seating state post-stress 422. The first seating state (pre-stress 401 or during-stress 411) may be for an unachieved seating tightness threshold (e.g., heat sink not sufficiently tight to lid to provide adequate thermal qualities). The second seating state (post-stress 422) may be for an achieved seating tightness threshold (e.g., heat sink sufficiently tight to lid to provide adequate thermal qualities). In embodiments, such thresholds may be directly proportional to an amount of applied stress or torque. In embodiments, such threshold may be measureable in units of distance, tension, pressure, force, or resulting thermal interface characteristics (e.g., heat dissipation).

The indicator 468 may be permanently attached to the horizontal portion 469. The permanent attachment 469 may include a weld, a glue, or may have been manufactured as all one object. In the second seating state 422, the indicator 468 may abut the vertical protrusion as shown at 495 with the achieved seating tightness threshold. For example, an indicator assembly can include a horizontal portion and cylindrical structure. When the right load and torque is applied, the screw head is in line with or touches the cylindrical structure—indicating that the heat sink attachment is correct. If there is a gap between the screw head and the cylinder, it indicates that the heat sink is not properly installed.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s). Therefore, while the foregoing is directed to exemplary embodiments, other and further embodiments of the invention may be devised without departing from the basic scope thereof, and the scope thereof is determined by the claims that follow.

What is claimed is:

1. A fastening device for a heat sink, comprising:
   a vertical protrusion for fastening;
   a horizontal portion for seating which has an inner bore for receiving the vertical protrusion; and
   an indicator for seating that abuts both the vertical protrusion and the horizontal portion, the indicator configured to have a first seating state for an unachieved seating tightness threshold and a second seating state for an achieved seating tightness threshold;
   wherein the vertical protrusion has a body area which fits through the inner bore, has a head area wider than the body area, and is configured to fasten the heat sink to an apparatus;
   wherein the horizontal portion extends from the vertical protrusion and has a wall configured to abut the indicator in the second seating state;
   wherein the horizontal portion has a floor having a diameter greater than the indicator in the first seating state, the floor including a first distinguishing feature including a visual element configured to be hidden beneath the indicator in the second seating state.

2. The fastening device of claim 1, wherein:
   the inner bore for receiving the vertical protrusion is a centered hole configured to allow the body area to fit through the centered hole and disallow the head area to fit through the centered hole; and the indicator has a second distinguishing feature for differentiation from the first distinguishing feature.

3. The fastening device of claim 1, wherein the indicator has a visually-identifiable feature that, in cooperation with the horizontal portion and the vertical protrusion, is configured to identify the second state for the achieved seating tightness threshold.

4. The fastening device of claim 1, wherein the indicator has a texturally-identifiable feature that, in cooperation with the horizontal portion and the vertical protrusion, is configured to identify the second state for the achieved seating tightness threshold.

5. The fastening device of claim 1, wherein the indicator is an elastomeric bellow.

6. The fastening device of claim 1, wherein the indicator is an elastomeric bellow having a first color and the horizontal portion has a floor having a second color that is a complementary color to the first color.

7. The fastening device of claim 1, wherein the indicator is an elastomeric bellow having a smooth texture and the horizontal portion has a floor having a rough texture.

8. The fastening device of claim 1, wherein the indicator is an elastomeric bellow having a first pattern and the horizontal portion has a floor having a second pattern that is different from the first pattern.

9. The fastening device of claim 5, wherein the elastomeric bellow is made of an elastomer for elastic properties to change shape in response to applied stress.

10. The fastening device of claim 9, wherein the horizontal portion is a c-cup having a wall configured to contain and abut the elastomeric bellow in the second seating state.

11. The fastening device of claim 9, wherein the elastomeric bellow includes ethylene propylene diene monomer (EPDM) rubber.

12. The fastening device of claim 2, wherein the floor has a diameter at least three times as large as a height of the wall.

13. The fastening device of claim 2, wherein the indicator is configured to be taller than the wall in the first seating state and shorter than the wall in the second seating state.

14. A heat sink fastening device, comprising:

a vertical protrusion for fastening that:

has a body area which fits through an inner bore, has a head area wider than the body area, and is configured to fasten a heat sink to an apparatus;

a horizontal portion for seating which is a c-cup that:

extends from the vertical protrusion, has the inner bore for receiving the vertical protrusion which is a centered hole configured to allow the body area to fit through the centered hole and disallow the head area to fit through the centered hole, has a floor having a diameter greater than an indicator in a first seating state, the floor including a first distinguishing feature including a visual element configured to be hidden beneath the indicator in a second seating state, and has a wall configured to abut the indicator in the second seating state; and the indicator for seating that abuts both the vertical protrusion and the horizontal portion, wherein the indicator:

is an elastomeric bellow, is configured to have the first seating state for an unachieved seating tightness threshold and the second seating state for an achieved seating tightness threshold, and has a second distinguishing feature for differentiation from the first distinguishing feature, the second distinguishing feature including both:

a visually-identifiable feature that, in cooperation with the horizontal portion and the vertical protrusion, is configured to identify the second state for the achieved seating tightness threshold, and a texturally-identifiable feature that, in cooperation with the horizontal portion and the vertical protrusion, is configured to identify the second state for the achieved seating tightness threshold.

* * * * *